United States Patent
Slocombe et al.

(10) Patent No.: US 9,021,112 B2
(45) Date of Patent: Apr. 28, 2015

(54) CONTENT REQUEST ROUTING AND LOAD BALANCING FOR CONTENT DISTRIBUTION NETWORKS

(75) Inventors: Michael Slocombe, Acton, MA (US);
Matthew Miller, Plainville, MA (US);
Casey Ajalat, North Billerica, MA (US);
Vincent A. Fuller, III, Palo Alto, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 12/050,648

(22) Filed: Mar. 18, 2008

(65) Prior Publication Data

US 2008/0235400 A1    Sep. 25, 2008

Related U.S. Application Data

(62) Division of application No. 09/982,721, filed on Oct. 18, 2001.

(51) Int. Cl.
*H04L 29/08* (2006.01)
*H04L 29/12* (2006.01)
*H04L 29/06* (2006.01)

(52) U.S. Cl.
CPC .......... *H04L 29/12066* (2013.01); *H04L 29/06* (2013.01); *H04L 29/12207* (2013.01); *H04L 61/1511* (2013.01); *H04L 61/20* (2013.01); *H04L 67/2895* (2013.01); *H04L 67/2842* (2013.01); *H04L 67/288* (2013.01)

(58) Field of Classification Search
None
See application file for complete search history.

(56) References Cited

U.S. PATENT DOCUMENTS

| | | | |
|---|---|---|---|
| 4,495,570 A | 1/1985 | Kitajima et al. | |
| 4,591,983 A | 5/1986 | Bennett et al. | |
| 4,594,704 A | 6/1986 | Ollivier | |
| 4,726,017 A | 2/1988 | Krum et al. | |
| 4,803,641 A | 2/1989 | Hardy et al. | |

(Continued)

FOREIGN PATENT DOCUMENTS

| | | |
|---|---|---|
| CA | 2202572 | 10/1998 |
| EP | 0800143 A | 10/1997 |

(Continued)

OTHER PUBLICATIONS

Zegura et al., Application Layer Anycasting: A Server Selection Architecture and Use in a Replicated Web service, Aug. 2000, IEEE, vol. 8, No. 4, pp. 455-466.*

(Continued)

*Primary Examiner* — Backhean Tiv

(57) ABSTRACT

A content distribution mechanism that distributes content of a content provider at various sites across a network and selects the site that is nearest a content requestor using an anycast address that resides at each of the sites. The sites are configured as nodes (or clusters) and each node includes a content server and a DNS server. The DNS servers are so associated with the content servers at their respective nodes as to resolve the name of the content provider to the IP address of the content servers at the nodes. The DNS servers each are assigned the anycast address in addition to a unique address, and the anycast address is advertised to the network (in particular, the network routing infrastructure) using Border Gateway Protocol (BGP). Node selection occurs when the network routing infrastructure selects a shortest path to the anycast address during DNS name resolution.

23 Claims, 5 Drawing Sheets

(56) References Cited

U.S. PATENT DOCUMENTS

| | | |
|---|---|---|
| 4,839,798 A | 6/1989 | Eguchi et al. |
| 4,847,784 A | 7/1989 | Clancey |
| 4,920,432 A | 4/1990 | Eggers |
| 4,922,417 A | 5/1990 | Churm et al. |
| 4,943,932 A | 7/1990 | Lark et al. |
| 4,949,187 A | 8/1990 | Cohen |
| 4,949,248 A | 8/1990 | Caro |
| 5,029,232 A | 7/1991 | Nall |
| 5,130,792 A | 7/1992 | Tindell et al. |
| 5,132,992 A | 7/1992 | Yurt et al. |
| 5,136,716 A | 8/1992 | Harvey |
| 5,172,413 A | 12/1992 | Bradley |
| 5,191,573 A | 3/1993 | Hair |
| 5,253,275 A | 10/1993 | Yurt et al. |
| 5,253,341 A | 10/1993 | Rozmanith |
| 5,287,499 A | 2/1994 | Nemes |
| 5,287,537 A | 2/1994 | Newmark et al. |
| 5,291,554 A | 3/1994 | Morales |
| 5,341,477 A | 8/1994 | Pitkin et al. |
| 5,371,532 A | 12/1994 | Gelman |
| 5,410,343 A | 4/1995 | Coddington |
| 5,414,455 A | 5/1995 | Hooper |
| 5,442,389 A | 8/1995 | Blahut |
| 5,442,390 A | 8/1995 | Hooper |
| 5,442,749 A | 8/1995 | Northcutt |
| 5,471,622 A | 11/1995 | Eadline |
| 5,475,615 A | 12/1995 | Lin |
| 5,508,732 A | 4/1996 | Bottomley |
| 5,515,511 A | 5/1996 | Nguyen |
| 5,519,435 A | 5/1996 | Anderson |
| 5,528,281 A | 6/1996 | Grady |
| 5,539,621 A | 7/1996 | Kikinis |
| 5,542,087 A | 7/1996 | Neimat et al. |
| 5,544,313 A | 8/1996 | Shachnai |
| 5,544,327 A | 8/1996 | Dan |
| 5,550,577 A | 8/1996 | Verbiest |
| 5,550,863 A | 8/1996 | Yurt |
| 5,550,982 A | 8/1996 | Long |
| 5,557,317 A | 9/1996 | Nishio |
| 5,572,643 A | 11/1996 | Judson |
| 5,590,288 A | 12/1996 | Castor |
| 5,592,611 A | 1/1997 | Midgely |
| 5,594,910 A | 1/1997 | Filepp et al. |
| 5,603,026 A | 2/1997 | Demers et al. |
| 5,619,648 A | 4/1997 | Canale |
| 5,623,656 A | 4/1997 | Lyons |
| 5,625,781 A | 4/1997 | Cline |
| 5,627,829 A | 5/1997 | Gleeson et al. |
| 5,630,067 A | 5/1997 | Kindell |
| 5,633,999 A | 5/1997 | Clowes |
| 5,634,006 A | 5/1997 | Baugher et al. |
| 5,638,443 A | 6/1997 | Stefik et al. |
| 5,644,714 A | 7/1997 | Kikinis |
| 5,646,676 A | 7/1997 | Dewkett et al. |
| 5,649,186 A | 7/1997 | Ferguson |
| 5,659,729 A | 8/1997 | Nielsen |
| 5,666,362 A | 9/1997 | Chen |
| 5,671,279 A | 9/1997 | Elgamal |
| 5,675,734 A | 10/1997 | Hair |
| 5,682,512 A | 10/1997 | Tetrick |
| 5,699,513 A | 12/1997 | Feigen et al. |
| 5,712,979 A | 1/1998 | Graber et al. |
| 5,715,453 A | 2/1998 | Stewart |
| 5,721,914 A | 2/1998 | DeVries |
| 5,734,831 A | 3/1998 | Sanders |
| 5,740,423 A | 4/1998 | Logan et al. |
| 5,742,762 A | 4/1998 | Scholl |
| 5,751,961 A | 5/1998 | Smyk |
| 5,761,507 A | 6/1998 | Govett |
| 5,761,663 A | 6/1998 | Lagarde et al. |
| 5,764,906 A | 6/1998 | Edelstein et al. |
| 5,774,660 A | 6/1998 | Brendel et al. |
| 5,774,668 A | 6/1998 | Choquier et al. |
| 5,777,989 A | 7/1998 | McGarvey |
| 5,784,058 A | 7/1998 | LaStrange et al. |
| 5,796,952 A | 8/1998 | Davis |
| 5,799,141 A | 8/1998 | Galipeau et al. |
| 5,802,106 A | 9/1998 | Packer |
| 5,802,291 A | 9/1998 | Balick et al. |
| 5,812,769 A | 9/1998 | Graber |
| 5,815,664 A | 9/1998 | Asano |
| 5,819,092 A | 10/1998 | Ferguson |
| 5,828,847 A | 10/1998 | Gehr |
| 5,832,506 A | 11/1998 | Kuzma |
| 5,832,514 A | 11/1998 | Norin et al. |
| 5,835,718 A | 11/1998 | Blewett |
| 5,845,303 A | 12/1998 | Templeman |
| 5,856,974 A | 1/1999 | Gervais et al. |
| 5,862,339 A | 1/1999 | Bonnaure et al. |
| 5,867,706 A | 2/1999 | Martin et al. |
| 5,867,799 A | 2/1999 | Lang et al. |
| 5,870,546 A | 2/1999 | Kirsch |
| 5,870,559 A | 2/1999 | Leshem et al. |
| 5,878,212 A | 3/1999 | Civanlar et al. |
| 5,884,038 A | 3/1999 | Kapoor |
| 5,890,171 A | 3/1999 | Blumer et al. |
| 5,893,116 A | 4/1999 | Simmonds et al. |
| 5,894,554 A | 4/1999 | Lowery et al. |
| 5,896,533 A | 4/1999 | Ramos et al. |
| 5,903,723 A | 5/1999 | Beck et al. |
| 5,907,704 A | 5/1999 | Gudmundson et al. |
| 5,913,028 A | 6/1999 | Wang et al. |
| 5,913,033 A | 6/1999 | Grout |
| 5,918,010 A | 6/1999 | Appleman et al. |
| 5,919,247 A | 7/1999 | Van Hoff et al. |
| 5,920,701 A | 7/1999 | Miller |
| 5,933,832 A | 8/1999 | Suzuoka et al. |
| 5,935,207 A | 8/1999 | Logue et al. |
| 5,945,989 A | 8/1999 | Freishtat et al. |
| 5,956,489 A | 9/1999 | San Andres et al. |
| 5,956,716 A | 9/1999 | Kenner |
| 5,958,008 A | 9/1999 | Pogrebisky et al. |
| 5,961,596 A | 10/1999 | Takubo et al. |
| 5,966,440 A | 10/1999 | Hair |
| 5,968,121 A | 10/1999 | Logan et al. |
| 5,978,791 A | 11/1999 | Faber et al. |
| 5,983,214 A | 11/1999 | Lang et al. |
| 5,983,227 A | 11/1999 | Nazem et al. |
| 5,987,606 A | 11/1999 | Cirasoie et al. |
| 5,991,809 A | 11/1999 | Kriegsman |
| 6,002,720 A | 12/1999 | Yurt et al. |
| 6,003,030 A | 12/1999 | Kenner et al. |
| 6,006,264 A | 12/1999 | Colby et al. |
| 6,012,090 A | 1/2000 | Chung et al. |
| 6,014,686 A | 1/2000 | Elnozahy et al. |
| 6,014,698 A | 1/2000 | Griffiths |
| 6,018,516 A | 1/2000 | Packer |
| 6,026,440 A | 2/2000 | Sharder et al. |
| 6,029,175 A | 2/2000 | Chow et al. |
| 6,029,176 A | 2/2000 | Cannon |
| 6,035,332 A | 3/2000 | Ingrassia, Jr. et al. |
| 6,038,216 A | 3/2000 | Packer |
| 6,038,310 A | 3/2000 | Hollywood et al. |
| 6,038,610 A | 3/2000 | Belfiore et al. |
| 6,041,324 A | 3/2000 | Earl et al. |
| 6,044,405 A | 3/2000 | Driscoll, III et al. |
| 6,046,980 A | 4/2000 | Packer |
| 6,049,831 A | 4/2000 | Gardell et al. |
| 6,052,718 A | 4/2000 | Gifford |
| 6,052,730 A | 4/2000 | Felciano et al. |
| 6,065,051 A | 5/2000 | Steele et al. |
| 6,065,062 A | 5/2000 | Periasamy et al. |
| 6,070,191 A | 5/2000 | Narendran et al. |
| 6,078,943 A | 6/2000 | Yu |
| 6,081,829 A | 6/2000 | Sidana |
| 6,081,835 A | 6/2000 | Antcliff |
| 6,092,112 A | 7/2000 | Fukushige |
| 6,092,204 A | 7/2000 | Baker |
| 6,105,028 A | 8/2000 | Sullivan et al. |
| 6,108,673 A | 8/2000 | Brandt et al. |
| 6,108,703 A | 8/2000 | Leighton |
| 6,112,231 A | 8/2000 | DeSimone et al. |
| 6,112,239 A | 8/2000 | Kenner |
| 6,112,240 A | 8/2000 | Pogue et al. |

(56) References Cited

U.S. PATENT DOCUMENTS

| | | | |
|---|---|---|---|
| 6,115,357 A | 9/2000 | Packer et al. | |
| 6,115,752 A | 9/2000 | Chauhan | |
| 6,119,143 A | 9/2000 | Dias et al. | |
| 6,125,388 A | 9/2000 | Reisman | |
| 6,128,601 A | 10/2000 | Van Horne et al. | |
| 6,128,660 A | 10/2000 | Grimm et al. | |
| 6,130,890 A | 10/2000 | Leinwand et al. | |
| 6,134,583 A | 10/2000 | Herriot | |
| 6,144,375 A | 11/2000 | Jain et al. | |
| 6,144,702 A | 11/2000 | Yurt et al. | |
| 6,144,996 A | 11/2000 | Starnes et al. | |
| 6,148,410 A | 11/2000 | Baskey et al. | |
| 6,151,624 A | 11/2000 | Teare et al. | |
| 6,154,738 A | 11/2000 | Call | |
| 6,154,744 A | 11/2000 | Kenner et al. | |
| 6,154,753 A | 11/2000 | McFarland | |
| 6,154,777 A | 11/2000 | Ebrahim | |
| 6,163,779 A | 12/2000 | Mantha et al. | |
| 6,167,427 A | 12/2000 | Rabinovich | |
| 6,167,438 A | 12/2000 | Yates et al. | |
| 6,173,311 B1 | 1/2001 | Hassett et al. | |
| 6,173,322 B1 | 1/2001 | Hu | |
| 6,175,869 B1 | 1/2001 | Ahuja et al. | |
| 6,178,160 B1 | 1/2001 | Bolton | |
| 6,181,867 B1 | 1/2001 | Kenner et al. | |
| 6,185,598 B1 | 2/2001 | Farber et al. | |
| 6,185,619 B1 | 2/2001 | Joffe et al. | |
| 6,189,030 B1 | 2/2001 | Kirsch et al. | |
| 6,189,039 B1 | 2/2001 | Harvey et al. | |
| 6,195,680 B1 * | 2/2001 | Goldszmidt et al. | 709/203 |
| 6,205,120 B1 | 3/2001 | Packer et al. | |
| 6,226,642 B1 | 5/2001 | Beranek et al. | |
| 6,226,684 B1 * | 5/2001 | Sung et al. | 709/238 |
| 6,230,196 B1 | 5/2001 | Guenthner et al. | |
| 6,240,461 B1 * | 5/2001 | Cieslak et al. | 709/235 |
| 6,243,760 B1 | 6/2001 | Armbruster | |
| 6,249,810 B1 | 6/2001 | Kiraly | |
| 6,256,675 B1 | 7/2001 | Rabinovich | |
| 6,266,339 B1 * | 7/2001 | Donahue et al. | 370/432 |
| 6,266,699 B1 | 7/2001 | Sevcik | |
| 6,269,394 B1 | 7/2001 | Kenner et al. | |
| 6,275,470 B1 | 8/2001 | Ricciulli | |
| 6,282,569 B1 | 8/2001 | Wallis et al. | |
| 6,282,574 B1 | 8/2001 | Voit | |
| 6,286,045 B1 | 9/2001 | Griffiths et al. | |
| 6,298,041 B1 | 10/2001 | Packer | |
| 6,311,214 B1 | 10/2001 | Rhoads | |
| 6,314,465 B1 | 11/2001 | Paul et al. | |
| 6,314,565 B1 | 11/2001 | Kenner et al. | |
| 6,330,605 B1 | 12/2001 | Christensen et al. | |
| 6,332,195 B1 | 12/2001 | Green et al. | |
| 6,338,044 B1 | 1/2002 | Cook et al. | |
| 6,347,085 B2 | 2/2002 | Kelly | |
| 6,360,256 B1 | 3/2002 | Lim | |
| 6,370,571 B1 | 4/2002 | Medin, Jr. | |
| 6,370,580 B2 | 4/2002 | Kriegsman | |
| 6,374,299 B1 | 4/2002 | Ford et al. | |
| 6,405,252 B1 | 6/2002 | Gupta et al. | |
| 6,405,256 B1 * | 6/2002 | Lin et al. | 709/231 |
| 6,405,257 B1 | 6/2002 | Gersht et al. | |
| 6,412,000 B1 | 6/2002 | Riddle et al. | |
| 6,412,002 B1 | 6/2002 | Denman et al. | |
| 6,415,280 B1 | 7/2002 | Farber et al. | |
| 6,421,726 B1 | 7/2002 | Kenner et al. | |
| 6,424,992 B2 * | 7/2002 | Devarakonda et al. | 709/203 |
| 6,430,618 B1 | 8/2002 | Karger et al. | |
| 6,434,608 B1 * | 8/2002 | Desai | 709/217 |
| 6,438,652 B1 * | 8/2002 | Jordan et al. | 711/120 |
| 6,442,549 B1 | 8/2002 | Schneider | |
| 6,456,630 B1 | 9/2002 | Packer et al. | |
| 6,460,082 B1 | 10/2002 | Lumelsky et al. | |
| 6,460,085 B1 | 10/2002 | Toporek et al. | |
| 6,463,454 B1 | 10/2002 | Lumelsky et al. | |
| 6,473,405 B2 | 10/2002 | Ricciulli | |
| 6,480,893 B2 | 11/2002 | Kriegsman | |
| 6,484,143 B1 | 11/2002 | Swildens et al. | |
| 6,484,204 B1 | 11/2002 | Rabinovich | |
| 6,490,580 B1 | 12/2002 | Dey et al. | |
| 6,490,615 B1 * | 12/2002 | Dias et al. | 709/219 |
| 6,493,707 B1 | 12/2002 | Dey et al. | |
| 6,496,856 B1 | 12/2002 | Kenner et al. | |
| 6,502,125 B1 | 12/2002 | Kenner et al. | |
| 6,502,215 B2 | 12/2002 | Raad et al. | |
| 6,505,248 B1 | 1/2003 | Casper et al. | |
| 6,529,477 B1 | 3/2003 | Toporek et al. | |
| 6,553,413 B1 | 4/2003 | Leighton et al. | |
| 6,553,420 B1 | 4/2003 | Karger et al. | |
| 6,557,054 B2 | 4/2003 | Reisman | |
| 6,564,251 B2 | 5/2003 | Katariya et al. | |
| 6,574,612 B1 | 6/2003 | Baratti et al. | |
| 6,577,595 B1 | 6/2003 | Counterman | |
| 6,581,090 B1 | 6/2003 | Lindbo et al. | |
| 6,584,083 B1 | 6/2003 | Toporek et al. | |
| 6,591,299 B2 | 7/2003 | Riddle et al. | |
| 6,601,084 B1 | 7/2003 | Bhaskaran et al. | |
| 6,611,862 B2 | 8/2003 | Reisman | |
| 6,614,757 B1 | 9/2003 | Rochberger et al. | |
| 6,625,643 B1 | 9/2003 | Colby et al. | |
| 6,636,499 B1 | 10/2003 | Dowling | |
| 6,654,344 B1 | 11/2003 | Toporek et al. | |
| 6,654,807 B2 | 11/2003 | Farber et al. | |
| 6,658,464 B2 | 12/2003 | Reisman | |
| 6,665,706 B2 | 12/2003 | Kenner et al. | |
| 6,665,726 B1 | 12/2003 | Leighton et al. | |
| 6,687,731 B1 | 2/2004 | Kavak | |
| 6,691,148 B1 | 2/2004 | Zinky et al. | |
| 6,694,358 B1 | 2/2004 | Swildens et al. | |
| 6,699,418 B2 | 3/2004 | Okada et al. | |
| 6,708,137 B2 | 3/2004 | Carley | |
| 6,711,152 B1 | 3/2004 | Kalmanek, Jr. et al. | |
| 6,718,328 B1 | 4/2004 | Norris | |
| 6,722,211 B1 | 4/2004 | Ciobanu et al. | |
| 6,741,563 B2 | 5/2004 | Packer | |
| 6,751,673 B2 | 6/2004 | Shaw | |
| 6,754,699 B2 | 6/2004 | Swildens et al. | |
| 6,754,706 B1 | 6/2004 | Swildens et al. | |
| 6,763,388 B1 | 7/2004 | Tsimelzon | |
| 6,778,502 B2 | 8/2004 | Ricciulli | |
| 6,779,017 B1 | 8/2004 | Lamberton et al. | |
| 6,785,704 B1 * | 8/2004 | McCanne | 718/105 |
| 6,795,858 B1 | 9/2004 | Jain et al. | |
| 6,799,221 B1 | 9/2004 | Kenner et al. | |
| 6,801,576 B1 | 10/2004 | Haldeman et al. | |
| 6,823,362 B2 * | 11/2004 | Eshghi | 709/203 |
| 6,834,306 B1 | 12/2004 | Tsimelzon | |
| 6,842,604 B1 | 1/2005 | Cook et al. | |
| 6,870,851 B1 | 3/2005 | Leinwand et al. | |
| 6,874,032 B2 | 3/2005 | Gersht et al. | |
| 6,901,604 B1 | 5/2005 | Kiraly | |
| 6,915,329 B2 | 7/2005 | Kriegsman | |
| 6,928,442 B2 | 8/2005 | Farber et al. | |
| 6,934,255 B2 | 8/2005 | Toporek et al. | |
| 6,938,095 B2 | 8/2005 | Basturk et al. | |
| 6,950,623 B2 | 9/2005 | Brown et al. | |
| 6,963,980 B1 | 11/2005 | Mattsson | |
| 6,963,981 B1 | 11/2005 | Bailey et al. | |
| 6,965,890 B1 | 11/2005 | Dey et al. | |
| 6,970,432 B1 | 11/2005 | Hankins et al. | |
| 6,973,485 B2 | 12/2005 | Ebata et al. | |
| 6,973,490 B1 | 12/2005 | Robertson et al. | |
| 6,981,050 B1 | 12/2005 | Tobias et al. | |
| 6,981,180 B1 | 12/2005 | Bailey et al. | |
| 6,996,616 B1 | 2/2006 | Leighton et al. | |
| 7,003,572 B1 | 2/2006 | Lownsbrough et al. | |
| 7,007,089 B2 | 2/2006 | Freedman | |
| 7,010,578 B1 | 3/2006 | Lewin et al. | |
| 7,012,900 B1 | 3/2006 | Riddle | |
| 7,039,633 B1 | 5/2006 | Dey et al. | |
| 7,047,300 B1 | 5/2006 | Oehrke et al. | |
| 7,054,935 B2 | 5/2006 | Farber et al. | |
| 7,058,706 B1 | 6/2006 | Iyer et al. | |
| 7,069,177 B2 | 6/2006 | Carley | |
| 7,075,897 B2 | 7/2006 | Uematsu | |
| 7,096,266 B2 | 8/2006 | Lewin et al. | |

(56) References Cited

U.S. PATENT DOCUMENTS

| | | |
|---|---|---|
| 7,103,645 B2 | 9/2006 | Leighton et al. |
| 7,103,647 B2 | 9/2006 | Aziz |
| 7,136,374 B1 | 11/2006 | Kompella |
| 7,181,523 B2 | 2/2007 | Sim |
| 7,209,959 B1* | 4/2007 | Campbell et al. ............ 709/219 |
| 7,286,479 B2 | 10/2007 | Bragg et al. |
| 7,343,422 B2 | 3/2008 | Garcia-Luna-Aceves et al. |
| 7,653,700 B1* | 1/2010 | Bahl et al. .................... 709/217 |
| 7,693,959 B2* | 4/2010 | Leighton et al. ............ 709/217 |
| 7,734,730 B2* | 6/2010 | McCanne ..................... 709/219 |
| 7,808,968 B1 | 10/2010 | Kalmanek, Jr. et al. |
| 2001/0029525 A1 | 10/2001 | Lahr |
| 2001/0042139 A1 | 11/2001 | Jeffords et al. |
| 2001/0052016 A1* | 12/2001 | Skene et al. .................. 709/226 |
| 2001/0056500 A1 | 12/2001 | Farber et al. |
| 2002/0018449 A1 | 2/2002 | Ricciulli |
| 2002/0021675 A1 | 2/2002 | Feldmann |
| 2002/0023164 A1 | 2/2002 | Lahr |
| 2002/0023165 A1 | 2/2002 | Lahr |
| 2002/0032777 A1 | 3/2002 | Kawata et al. |
| 2002/0040404 A1 | 4/2002 | Lahr |
| 2002/0042817 A1 | 4/2002 | Lahr |
| 2002/0046273 A1 | 4/2002 | Lahr et al. |
| 2002/0046405 A1 | 4/2002 | Lahr |
| 2002/0049857 A1 | 4/2002 | Farber et al. |
| 2002/0059592 A1 | 5/2002 | Kiraly |
| 2002/0066038 A1 | 5/2002 | Mattsson |
| 2002/0073199 A1 | 6/2002 | Levine et al. |
| 2002/0075836 A1 | 6/2002 | Uematsu |
| 2002/0078263 A1 | 6/2002 | Darling et al. |
| 2002/0082999 A1 | 6/2002 | Lee et al. |
| 2002/0083124 A1 | 6/2002 | Knox et al. |
| 2002/0099850 A1 | 7/2002 | Farber et al. |
| 2002/0116481 A1* | 8/2002 | Lee .............................. 709/220 |
| 2002/0124080 A1 | 9/2002 | Leighton et al. |
| 2002/0129134 A1 | 9/2002 | Leighton et al. |
| 2002/0131645 A1 | 9/2002 | Hamilton |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0163882 A1 | 11/2002 | Bornstein et al. |
| 2002/0166117 A1 | 11/2002 | Abrams et al. |
| 2002/0199016 A1 | 12/2002 | Freedman |
| 2003/0009444 A1 | 1/2003 | Eidler et al. |
| 2003/0018966 A1 | 1/2003 | Cook et al. |
| 2003/0028623 A1 | 2/2003 | Hennessey et al. |
| 2003/0028626 A1 | 2/2003 | Hennessey et al. |
| 2003/0028777 A1 | 2/2003 | Hennessey et al. |
| 2003/0041238 A1 | 2/2003 | French et al. |
| 2003/0055972 A1 | 3/2003 | Fuller et al. |
| 2003/0061263 A1 | 3/2003 | Riddle |
| 2003/0061280 A1 | 3/2003 | Bulson et al. |
| 2003/0065761 A1 | 4/2003 | Cereja et al. |
| 2003/0078888 A1 | 4/2003 | Lee et al. |
| 2003/0078889 A1 | 4/2003 | Lee et al. |
| 2003/0079005 A1 | 4/2003 | Myers et al. |
| 2003/0079027 A1* | 4/2003 | Slocombe et al. ............ 709/229 |
| 2003/0105604 A1 | 6/2003 | Ash et al. |
| 2004/0022194 A1 | 2/2004 | Ricciulli |
| 2004/0139097 A1 | 7/2004 | Farber et al. |
| 2004/0177148 A1 | 9/2004 | Tsimelzon |
| 2004/0249960 A1 | 12/2004 | Hardy et al. |
| 2005/0010653 A1* | 1/2005 | McCanne ..................... 709/219 |
| 2005/0033858 A1 | 2/2005 | Swildens et al. |
| 2005/0038851 A1 | 2/2005 | Kriegsman |
| 2005/0100027 A1 | 5/2005 | Leinwand et al. |
| 2005/0114296 A1 | 5/2005 | Farber et al. |
| 2005/0262104 A1 | 11/2005 | Robertson et al. |
| 2006/0143293 A1 | 6/2006 | Freedman |
| 2006/0271705 A1 | 11/2006 | Garcia-Luna-Aceves |
| 2008/0235400 A1* | 9/2008 | Slocombe et al. ............ 709/245 |

FOREIGN PATENT DOCUMENTS

| | | |
|---|---|---|
| EP | 0801487 A2 | 10/1997 |
| EP | 0817444 A2 | 1/1998 |
| EP | 0824236 A2 | 2/1998 |
| EP | 0865180 A2 | 9/1998 |
| GB | 2281793 | 3/1995 |
| JP | 07-066829 | 3/1995 |
| JP | 10-027148 | 1/1998 |
| JP | 10-093552 | 4/1998 |
| JP | 10-126445 | 5/1998 |
| JP | 10-171727 | 6/1998 |
| JP | 2001-053793 | 2/2001 |
| WO | WO 96 42041 | 12/1996 |
| WO | WO 97 11429 | 3/1997 |
| WO | WO 97 29423 | 8/1997 |
| WO | WO 98 04985 | 2/1998 |
| WO | WO 98 06033 | 2/1998 |
| WO | WO 99 09726 A | 2/1999 |
| WO | WO 99 29083 A | 6/1999 |
| WO | WO 99 40514 | 8/1999 |
| WO | WO 00 52594 A | 9/2000 |

OTHER PUBLICATIONS

Adler, R. M., "Distributed Coordination Models for Client/Server Computing," Computer 28, 4 (Apr. 1995), 14-22.

Andresen et al., "SWEB: Towards a Scalable World Wide Web Server on Multicomputers", Proc. IPPS, (Apr. 15, 1996), 850-856.

Andresen, D., et al., Multiprocessor scheduling with client resources to improve the response time of WWW applications, Proc. 11th Intl Conf. on Supercomputing (Austria, Jul. 1997). ICS '97. ACM Press, NY, NY, 92-99.

Basturk, E., et al., "Using network layer anycast for load distribution in the Internet", Tech. Rep., IBM T.J. Watson Research Center, 1997 (21 pgs.).

Berners-Lee et al., RFC 1738—"Uniform Resource Locators (URL)", University of Minnesota, Dec. 1994, 1-25.

Bestavros, A., "Speculative Data Dissemination and Service to Reduce Server Load, Network Traffic and Service Time in Distributed Information Systems", In Proc. ICDE '96: The 1996 Int'l Conf. on Data Engineering, (Mar. 1996), 4 pages.

Bestavros, et al., "Server-Initiated Document Dissemination for the WWW," IEEE Data Engineering Bulletin 19(3):3-11, Sep. 1996, 1-8.

Bhattacharjee et al., "Application-layer anycasting," in Proc. IEEE INFOCOM '97, 1997, 1-9.

Braun, H., et al., "Web traffic characterization: an assessment of the impact of caching documents from NCSA's web server", Comput. Netw. ISDN Syst. 28, 1-2 (Dec. 1995), 37-51.

Brisco, T. P. RFC 1794: DNS support for load balancing, Apr. 1995, 1-7.

Carter et al., "Dynamic server selection using bandwidth probing in wide-area networks," Tech. Rep. BU-CS-96-007, Comp. Sci. Dept., Boston University, Mar. 1996, 1-20.

Carter et al., Server selection using dynamic path characterization in Wide-Area Networks, IEEE INFOCOM '97, (pp. 1014-1021), 1997, 1-8.

Carter, J. Lawrence et al., "Universal Classes of Hash Functions", Journal of Computer and System Sciences, vol. 18, No. 2, 143-154 (Apr. 1979), 106-112.

Chankhunthod, A. et al., "A Hierarchical Internet Object Cache", Proc. of the 1996 USENIX Technical Conf., Jan. 1996, pp. 153-163.

Cisco Systems, Inc., Cisco DistributedDirector 4700-M Installation and Configuration Guide, pp. xix-xxii; 1-1 to 1-14; 7-1 to 7-18, 8-1 to 8-20; pub. date unknown, [downloaded Apr. 2007 from http://www.cisco.com/univercd/cc/td/doc/product/iaabu/distrdir/dd4700m/].

Cisco Systems, Inc., Cisco DistributedDirector 2500 Series Installation and Configuration Guide, pp. xix-xxii; 1-1 to 1-12; 6-1 to 6-18; 7-1 to 7-18; 8-1 to 8-24, pub. date unknown, downloaded Apr. 2007: http://www.cisco.com/univercd/cc/td/doc/product/iaabu/distrdir/dd2501/.

Cisco Systems, Inc., "Cisco Distributed Director" http://www.cisco.com/warp/public/751/distdir/dd_wp.htm, 1997, 16 pages.

(56) References Cited

OTHER PUBLICATIONS

Cohen, J., et al., "Cache Array Routing Protocol v1.1", Sep. 29, 1997; http://tools.ietf.org/id/draft-vinod-carp-v1-01.txt (Last-Modified: Wed, Oct. 1, 1997), 8 pages.
Colajanni, M. and Yu, P. S. 1997. "Adaptive TTL schemes for load balancing of distributed Web servers. SIGMETRICS" Perform. Eval. Rev. 25, 2 (Sep. 1997), 36-42.
"Content Management Technology/Industry News," Content Technologies Trends and Advice, Gilbane Report, News for Jun. 1999 [21 pages].
Cormen, T. H., et al., "Introduction to Algorithms", The MIT Press, Cambridge, Massachusetts, (1990), 219-243, 991-993.
Crovella et al., "Dynamic server selection in the Internet", 3rd IEEE Workshop on the Arch. and Implementation of High Performance Computer Sys. '95, pp. 158-162, Aug. 1995.
Thaler, D. G. and Ravishankar, C. V. 1998. "Using name-based mappings to increase hit rates". IEEE/ACM Trans. Netw. 6, 1 (Feb. 1998), 1-14.
Danzig, P. B., et al., An analysis of wide-area name server traffic: a study of the Internet Domain Name System, Conf. Proc. Communications Architectures & Protocols (Aug. 1992). D. Oran, Ed. SIGCOMM '92. ACM Press, New York, NY, 281-292.
De Bra, P.M.E., et al., "Information Retrieval in the World Wide Web: Making Client-Based Searching Feasible", Computer Networks and ISDN Systems, NL, North Holland Publishing, Amsterdam, vol. 27, No. 2, ISSN: 0169-7552, (Nov. 1, 1994), 183-192.
Deering, S. E., et al, "Multicast routing in datagram internetworks and extended LANs," ACM Trans. Comput. Syst. 8, 2 (May 1990), 85-110.
Devine, R., "Design and Implementation of DDH: A Distributed Dynamic Hashing Algorithm", in Proc. 4th Int'l Conf. on Foundations of Data Organizations and Algorithms, (1993), 101-114.
Doi, K. "Super Proxy Script—How to make distributed proxy servers by URL hashing," Sharp Corp., http://naragw.sharp.co.jp/sps/, dates unknown (1996-2000), download Jul. 7, 2007.
"Exporting Web Server Final Report," http://www.cs.technion.ac.il/Labs/Lccn/projects/spring97/project4/final_report.html, Spring 1997 (downloaded Jul. 7, 2007).
Feeley, M., et al., "Implementing Global Memory Management in a Workstation Cluster", in Proc. 15th ACM Symp. on Operating Systems Principles, (1995), 201-212.
Floyd, S., et al., "A Reliable Multicast Framework for Light-Weight Sessions and Application Level Framing", in Proc. of ACM SIGCOMM '95, 342-356, Aug. 1995.
Fox, A., "A Framework for Separating Server Scalability and Availability from Internet Application Functionality", PhD thesis, University of California, Berkeley, 1998, 163 pages.
Fox, A., et al,. "Cluster-based scalable network services", Proc. 16th ACM Symp. on Operating Systems Principles (Saint Malo, France, Oct. 5-8, 1997). W. M. Waite, Ed. SOSP '97. ACM Press, New York, NY, 78-91.
Fredman, M., et al., "Storing a Sparse Table with 0(1) Worst Case Access Time", J. ACM, vol. 31, No. 3, (Jul. 1984), 538-544.
Goldszmidt, et al., "Load Distribution for Scalable Web Servers: Summer Olympics 1996—A Case Study," in Proc. 8th IFIP/IEEE Int'l Workshop on Distributed Systems: Operations and Management, Sydney, Australia, Oct. 1997, 10 pages.
Grigni, M., et al., "Tight Bounds on Minimum Broadcasts Networks", SIAM J. Disc. Math. 4 (1991), 207-222, (1991) 25 pages.
Gulbrandsen, A., et al., "A DNS RR for specifying the location of services" (DNS SRV), Network Working Group, RFC 2052, Oct. 1996, 1-10.
Guyton et al., "Locating nearby replicated Internet servers," Proc. ACM SIGCOMM '95, pp. 288-298, 1995, 1-18.
Gwertzman, J., et al., "The Case for Geographical Push-Caching", Proc. Workshop on Hot OS '95, (May 4, 1995), 51-55.
Gwertzman, J., et al., "World-Wide Web Cache Consistency", Proc. 1996 USENIX Tech. Conf., pp. 141-151, San Diego, CA, Jan. 1996, 11 pages.

IBM Technical Disclosure Bulletin,"Local Area Network Server Replacement Procedure", vol. 38, No. 1, (Jan. 1995), 235-236.
Jeffrey et al., Proxy-Sharing Proxy Servers, IEEE, pp. 116-119, 1996, 1-4.
Karger, D., et al., "Consistent Hashing and Random Trees: Distributed Caching 43 Protocols for Relieving Hot Spots on the World Wide Web", in Proc. 29th Annual ACM Symp. on Theory of Computing, (May 1997), 654-663.
Kwan et al., NCSA's World Wide Web Server: Design and Performance, IEEE, pp. 68-74, Nov. 1995, 1-23.
Schemers, R., "lbnamed—A load balancing name server written in Perl," 1995 LISA IX Sep. 17-22, 1995 Monterey, CA, 1-12.
Litwin, W., et al., "LH*—A Scalable, Distributed Data Structure", ACM Trans. on Database Systems, vol. 21, No. 4, pp. 480-525, 1996, 1-43.
Luotonen et al., World-Wide Web Proxies, CERN, Apr. 1994 (modified May 24, 1994), 1-8.
Malpani, R., et al., "Making World Wide Web Caching Servers Cooperate", in Proc. 4th Int'l. World Wide Web Conf. (Dec. 1995), 10 pages (downloaded from http://www.w3.org/Conferences/WWW4/Papers/59/ on Jul. 7, 2007), 10 pages.
Panigrahy, R., "Relieving Hot Spots on the World Wide Web", Master's thesis, MIT EECS, Jun. 1997, pp. 1-66.
Mockapetris et al., "Development of the Domain Name System," Proc. SIGCOMM '88 Computer Communications Review, vol. 18, No. 4, Aug. 1988, 112-122.
Mockapetris, P., RFC 1034: Domain Names—Concepts and Facilities, Nov. 1987, 1-55.
Mockapetris, P., RFC 1035: Domain Names—Implementation and Specification, Nov. 1987, 1-55.
Mourad et al., "Scalable Web Server Architectures," iscc, 2nd IEEE Symposium on Computers and Communications (ISCC '97), 1997, 12-16.
Nisan, N. 1990. Pseudorandom generators for space-bounded computations. In Proc. 22nd Annual ACM Symp. on theory of Computing (Baltimore, MD, U.S., May 13-17, 1990). H. Ortiz, Ed. STOC '90. ACM Press, New York, NY, 204-212.
Oguchi et al., A Study of Caching Proxy Mechanisms Realized on Wide Area Distributed Networks, High Performance Distributed Computing, 5th Int'l Symposium, 1996 443-449.
Palmer, M., et al., "Fido: A Cache that Learns to Fetch", in Proc. The 17th Intl Conf. on Very Large Data Bases, (Sep. 1991), 255-264.
Peleg, D., et al., "The Availability of Quorum Systems", Information and Computation, 123, 210-223, (1995), 31 pages.
Peterson, Eric, "Cisco Takes Global Route", PC Week News, (Feb. 17, 1997), p. 23.
Petri S., et al., "Load Balancing and Fault Tolerance in Workstation Clusters. Migrating Groups of Communicating Processes.", Operating Systems Review, vol. 29, No. 4, Oct. 1995, 25-36.
Plaxton, G. C., et al., "Fast Fault-Tolerant Concurrent Access to Shared Objects", in Proc. 37th IEEE Symp. of Foundations of Computer Science, 570-579, (1996), 10 pages.
J. Postel, "Domain Name System Structure and Delegation", RFC 1591, Mar. 1994 1-7.
Rabin, M. O., 1989, "Efficient dispersal of information for security, load balancing, and fault tolerance", J. ACM 36, 2 (Apr. 1989), 335-348.
Ross, K.W., "Hash-Routing for Collections of Shared Web Caches", IEEE Network Magazine, 11, 7:37-44, Nov.-Dec. 1997, 1-21.
Schuba, Christoph; "Addressing Weaknesses in the Domain Name System Protocol," COAST Laboratory, Dept. of Computer Sciences, Purdue University; West Layfayette, IN; Aug. 1993, p. 1-87.
Neil Smith, "What can Archives offer the World Wide Web?", Technical Report 11, University of Kent, Computing Laboratory, University of Kent, Canterbury, UK, 1994, 1-12.
Tarjan, Robert E., et al., "Storing a Sparse Table", Commun.ACM, 22, 11, (Nov. 1979), 606-611.
Vitter, J. S., et al., "Optimal Prefetching via Data Compression," Proc. 32nd Annual IEEE Symposium on Foundations of Computer Science (Oct. 1991), 21 pages.
Vixie, Paul; "Name Server Operations Guide for BIND," Internet Software Consortium; La Honda, CA; p. SMM:10-2-SMM:10-30 (undated, 1996), 1-30.

(56) References Cited

OTHER PUBLICATIONS

Jeff Walsh, "Global IP/PX Service Should Keep Network Delays Down", Infoworld, (Jan. 20, 1997), 1-2.
Duane Wessels, "Intelligent Caching for World-Wide Web Objects", Masters Thesis, University of Colorado, 1995, 1-84.
Yao, A. C. 1981. "Should Tables Be Sorted?". J. ACM 28, 3 (Jul. 1981), 615-628.
Narten, T., IBM, "Neighbor Discovery for IP Version 6", RFC 2461, Dec. 1998.
Bestavros, "Demand-Based Document Dissemination to Reduce Traffic and Balance Load in Distributive Information Systems," IEEE Symposium on Parallel and Distributed Processing (PDP), San Antonio, TX, Oct. 1995.
Cisco Distributed Director (1996).
Mockapetris, "Domain Names—Concepts and Facilities," IETF RFC 1034, Nov. 1987.
Mockapetris, "Domain Names—Implementation and Specification," IETF RFC 1035, Nov. 1987.
Brisco, T., "DNS Support for Load Balancing," IETF RFC 1794, Apr. 1995.
Berners-Lee, T. & Connolly, D., "Hypertext Markup Language—2.0," Internet Engineering Task Force (IETF) Request for Comments (RFC) 1866, Nov. 1995.
Wessels, D., et al., "Application of Internet Cache Protocol (ICP), version 2" Internet Engineering Task Force (IETF) Request for Comments (RFC) 2187, Sep. 1997.
Berners-Lee, T., et al., "Hypertext Transfer Protocol—HTTP/1.0," Internet Engineering Task Force (IETF) Request for Comments (RFC) 1945, May 1996.
Berners-Lee, T. "Resource Identifiers in WWW: A Unifying Syntax for the Expression of Names and Addresses of Objects on the Network as used in the World-Wide Web," Internet Engineering Task Force (IETF) Request for Comments (RFC) 1630, Jun. 1994.
Berners-Lee, T., et al., RFC 1738—Uniform Resource Locators, Dec. 1994.
Callon, R., "Use of OSI IS-IS for Routing in TCP/IP and Dual Environments," Internet Engineering Task Force (IETF) Request for Comments (RFC) 1195, Dec. 1990.
Chandra, R. et al., "BGP Communities Attribute," Internet Engineering Task Force (IETF) Request for Comments (RFC) 1997, Aug. 1996.
Chen, E., et al., "An Application of the BGP Community Attribute in Multi-home Routing," Internet Engineering Task Force (IETF) Request for Comments (RFC) 1998, Aug. 1996.
Colajanni, M., et al., "Scheduling Algorithms for Distributed Web Servers," International Conf. on Distributed Computing Systems (ICDCS), Baltimore, Maryland, USA, May 1997.
Eriksson, H., "MBONE: The Multicast Backbone," Communications of the ACM, vol. 37, No. 8, p. 54-60, Aug. 1994.
Wessels, D., et al., "Internet Cache Protocol (ICP), version 2," Internet Engineering Task Force (IETF) Request for Comments (RFC) 2186, Sep. 1997.
Fielding, R., et al., "Hypertext Transfer Protocol—HTTP/1.1," Internet Engineering Task Force (IETF) Request for Comments (RFC) 2068, Jan. 1997.
Malkin, G., "RIP Version 2 Carrying Additional Information," Internet Engineering Task Force (IETF) Request for Comments (RFC) 1388, Jan. 1993.
Moy, J., "OSPF Version 2," Internet Engineering Task Force (IETF) Request for Comments (RFC) 1583, Mar. 1994.
Parris C., et al, "A Dynamic Connection Management Scheme for Guaranteed Performance Services in Packet-Switching Integrated Services Networks," UC Berkeley Computer Science Division Tech. Report TR-93-005, 1993.
Partridge, C., et al., "Host Anycasting Service," Internet Engineering Task Force (IETF) Request for Comments (RFC) 1546, Nov. 1993.
Rekhter Y., et al., "A Border Gateway Protocol 4 (BGP-4)," Internet Engineering Task Force (IETF) Request for Comments (RFC) 1771, Mar. 1995.
Rekhter Y., et al., "Application of the Border Gateway Protocol in the Internet," Internet Engineering Task Force (IETF) Request for Comments (RFC) 1772, Mar. 1995.
Topolcic, C., "Experimental Internet Stream Protocol, Version 2 (ST-II)," Internet Engineering Task Force (IETF) Request for Comments (RFC) 1190, Oct. 1990.
Touch, J. et al., "The X-Bone,". Third Global Internet Mini-Conference at Globecom '98. Sydney, Australia, Nov. 1998, pp. 59-68 (pp. 44-52 of the mini-conference).
Traina, P., "BGP-4 Protocol Analysis," Internet Engineering Task Force (IETF) Request for Comments (RFC) 1774, Mar. 1995.
Traina, P., "Experience with the BGP-4 protocol," Internet Engineering Task Force (IETF) Request for Comments (RFC) 1773, Mar. 1995.
Baentsch, M., et al., "Introducing Application-Level Replication and Naming into Today's Web," Computer Networks and ISDN Systems, vol. 28, No. 7-11, pp. 921-930, May 1996.
Bhattacharjee et al., "Application-layer anycasting," in Proc. IEEE INFOCOM '97, Apr. 1997.
Almeroth, K., et al. "Scalable Delivery of Web Pages Using Cyclic Best-Effort (UDP) Multicast", IEEE INFOCOM, San Francisco, California, USA, Jun. 1998.
Collins, A., "The Detour Framework for Packet Rerouting," University of Washington, Oct. 29, 1998.
http://web.archive.org/web/19990202122310/http://www.cs/washington.edu/research/networking/detour/.
Savage, S., et al., "Detour: Informed Internet Routing and Transport," IEEE Micro, Jan.-Feb. 1999.
Schemers, R., "Ibnamed: A Load Balancing Name Server in Perl." 1995 LISA IX, Monterey, California, Sep. 17-22, 1995.
Berners-Lee, T., et al., "Hypertext Transfer Protocol—HTTP/1.0," Internet Engineering Task Force (IETF) Internet Draft, draft-ietf-http-v10-spec-00.ps, Mar. 1995.
Fielding, R., et al., "Hypertext Transfer Protocol—HTTP/1.1," Internet Engineering Task Force (IETF) Internet Draft, draft-ietf-http-v11-spec-00.txt, Nov. 1995.
Final Office Action, mailed Oct. 22, 2013, U.S. Appl. No. 09/982,721, filed Oct. 18, 2001, 14 pgs.

\* cited by examiner

CONTENT REQUEST ROUTING AND LOAD BALANCING FOR CONTENT DISTRIBUTION NETWORKS

CROSS REFERENCE TO RELATED APPLICATIONS

This is a divisional application of U.S. application Ser. No. 09/982,721 entitled "Content Request Routing and Load Balancing for Content Distribution Networks", filed Oct. 18, 2001, which is hereby incorporated by reference in its entirety.

BACKGROUND

Embodiments of the invention relate generally to information retrieval in a network and, more particularly, to hosting and distributing content on a content delivery network such as the Internet.

The World Wide Web is the Internet's content retrieval system. In the Web environment, client systems effect transactions to Web servers using the Hypertext Transfer Protocol (HTTP), which provides clients with access to files (e.g., text, graphics, images, sound, video, etc.) using a standard page description language, for example, Hypertext Markup Language (HTML). A network path to a server is identified by a so-called Uniform Resource Locator (URL) having a special syntax for defining a network connection. Use of a Web browser at a client (end user) system involves specification of a link via the URL. In response, the client system makes a request to the server (sometimes referred to as a "Web site") identified in the link and, in return, receives content from the Web server. The Web server can return different content data object types, such as .gif and jpeg files (graphics), .mpeg files (video), .wav files (audio) and the like.

As the Web server content provided by World Wide Web has continued to grow over time, so too has the number of users demanding access to such content. Unfortunately, the ever-increasing number of end users requesting Web content from Web sites has resulted in serious bandwidth and latency issues, which manifest themselves in delay to the end user.

To address these problems, many networking product and service providers have developed solutions that distribute Web site content across the network in some manner. One class of solutions involves replicating Web servers at multiple locations and directing traffic (by modifying the URL and forwarding, or using HTTP re-direct) to the "best" server based on a predefined selection policy, e.g., load balancing, network topology. Another class of solutions distributes content strategically and/or geographically, and often uses some type of centralized or hierarchical Domain Name System (DNS)-based site selection. The distributed sites include servers that perform reverse proxy with (or without) caching. One such technique routes traffic to a content distribution site nearest the requestor by modifying URLs in the top-level Web page. Other DNS techniques use a round robin traffic distribution to distribute load to the content sites, but do not take into account the location of the requester relative to those content sites.

SUMMARY

In one aspect, embodiments of the invention provide a method of content delivery in a network. The method includes associating devices in a Domain Name System (DNS) with content server systems located in the network, the content server systems maintaining and serving content of a content provider, each DNS device configured to resolve the name of the content provider to an address for the content server system with which such DNS device is associated. The method further includes assigning to the DNS devices a common address, the common address being usable to resolve the name of the content provider such that a request for content of the content provider by a content requester is sent to the content server system nearest the content requestor.

Particular implementations of the invention may provide one or more of the following advantages.

A performance benefit is gained because a content requestor can generally retrieve content from a content site closer than the origin server of the content provider. In addition, because there are multiple sites serving the content, the load from many end users is distributed among multiple systems and across different parts of the network. Also, an end user's DNS request can be routed to a content site nearest the requestor using pre-existing routing infrastructure. Because DNS uses a stateless protocol (UDP) for routing, the solution can handle anycast addressable caching without the problems associated with anycast service, namely, the potential packet-by packet load balancing site effects of protocols like TCP which maintain state information.

Other features and advantages of the invention will be apparent from the following detailed description and from the claims.

BRIEF DESCRIPTION OF DRAWINGS

Like reference numbers will be used to represent like elements.

DETAILED DESCRIPTION

Embodiments of the present invention feature a content distribution mechanism for routing a content request to the nearest content distribution site in a content distribution network. It also provides for load sharing across multiple content distribution sites in a content distribution network. The content distribution mechanism has particular utility in and is therefore described within the context of an Internet-based, World Wide Web ("Web") network infrastructure.

Hereinafter, the following terminology is used:

"Content provider" refers to an entity having a Web site on a network. Generally, the entity produces the content for the Web site. The entity may operate a Web server system or may use the services of a hosting provider.

"End user" refers to a person who wishes to view the Web content. Typically, an end user uses a Web browser, such as Netscape Navigator or Internet Explorer, executing on a computer system, e.g., a personal computer.

"Domain Name System" (DNS) refers to a collection of systems available on the public Internet that can resolve a domain name to a specific Internet Protocol (IP) address, as is known in the art.

It will be understood that reference to distance on the network, such as one server being "closer" to an end user than another server, refers to a network distance. Thus, a shorter distance implies a better path based on network criteria, and not necessarily a shorter geographic distance.

In the description to follow, a fictitious company "ABCD" is used as an example of a content provider having a Web site on a network.

Figure 1:
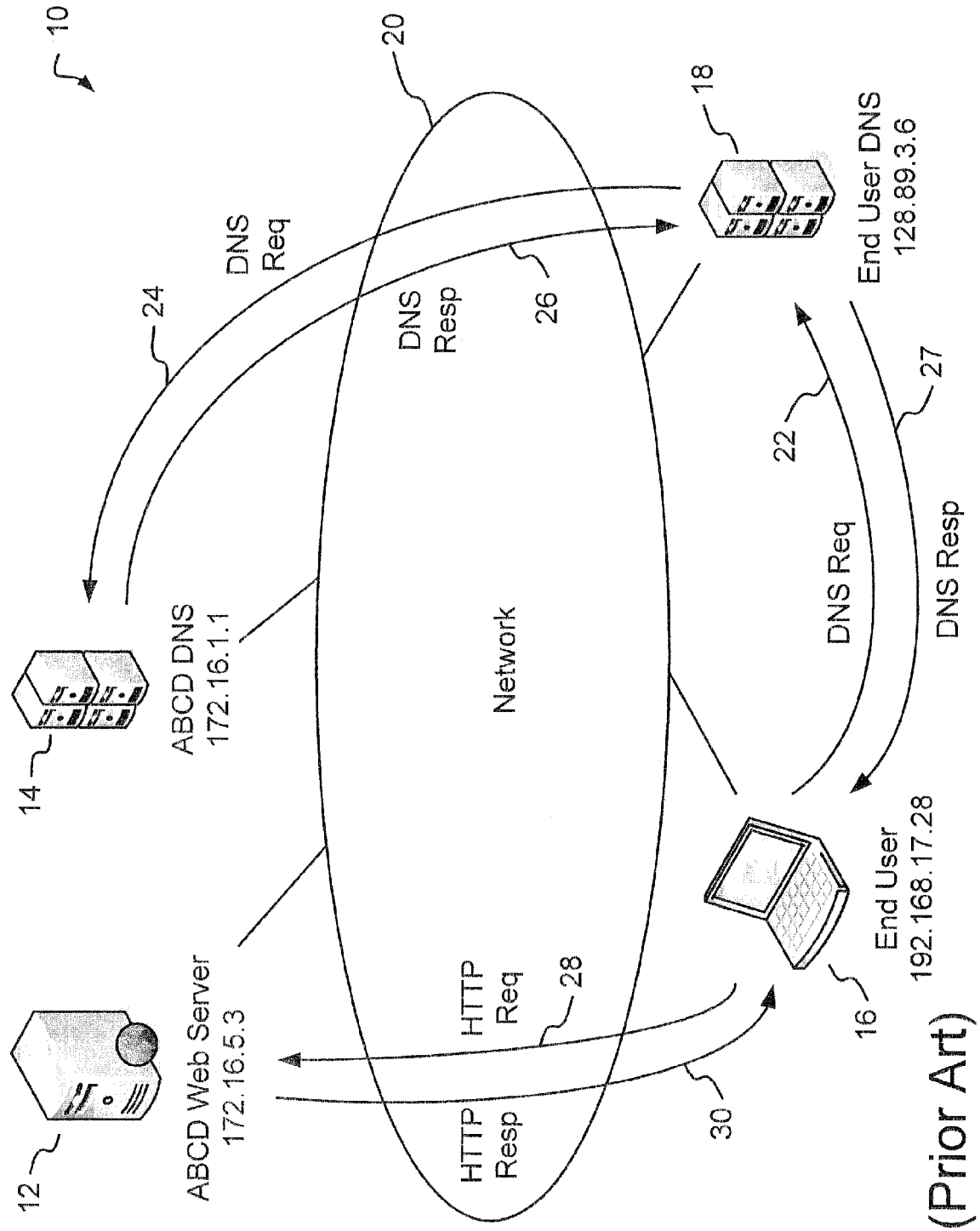
FIG. 1 is a depiction of a prior Web transaction.

FIG. 1 shows a conventional content delivery Web transaction 10. The transaction 10 involves a Web server 12 (also referred to as an "origin server"), an authoritative DNS system 14, an end-user system 16 and an end-user DNS system 18, all of which are coupled to a network 20, for example, the public Internet. The Web server 12 is a computer system containing content (e.g., Web pages) for a content provider, with the ability to provide this content in response to a Web request via the HTTP protocol. The authoritative DNS system 14 is a DNS system that can resolve domain names within the content provider's namespace.

For example, the DNS system 14 for the company "ABCD" would have information for host names ending in ".abcd.com" (such as "www.abcd.com"). Typically, the end-user system 16 is a computer being operated by an end user to perform Web "browsing" (that is, view Web pages). The end-user DNS system 18 is a DNS server that the end-user system 16 uses to resolve domain names to IP addresses.

When the end user wishes to view a Web page or object (such as "www.abcd.com/PriceList"), the transaction 10 occurs as follows. First, the end user using the end user system 16 enters the name of a Web page into a browser (not shown) executing on the end user system 16. The end-user system 16 requests a DNS resolution for the host name ("www.abcd.com") from the end-user DNS system 18 ("DNS Req 22"). The end-user DNS system 18 determines which of the DNS systems that make up the DNS for the network 20 can resolve this host name by sending a DNS request to the authoritative DNS system 14 ("DNS Req 24"). The authoritative DNS system 14 resolves the name to an IP address and returns a response containing the IP address to the end-user 16 system via the end-user DNS system 18 ("DNS Resp 26"). The end-user DNS system 18, in turn, communicates the IP address to the end-user station 16 in a DNS response to the end-user system 16 ("DNS Resp 27"). The end-user system 16 contacts the Web server 12 at the specified IP address and requests the Web object ("www.abcd.comlPriceList") ("HTTP Req 28"). The Web server 12 returns the Web page corresponding to the requested Web object to the end-user system 16 ("HTTP Resp" 30). The browser running on the end-user station 16 displays the returned Web page on the end-user system 16 for viewing by the end user.

Figure 2:
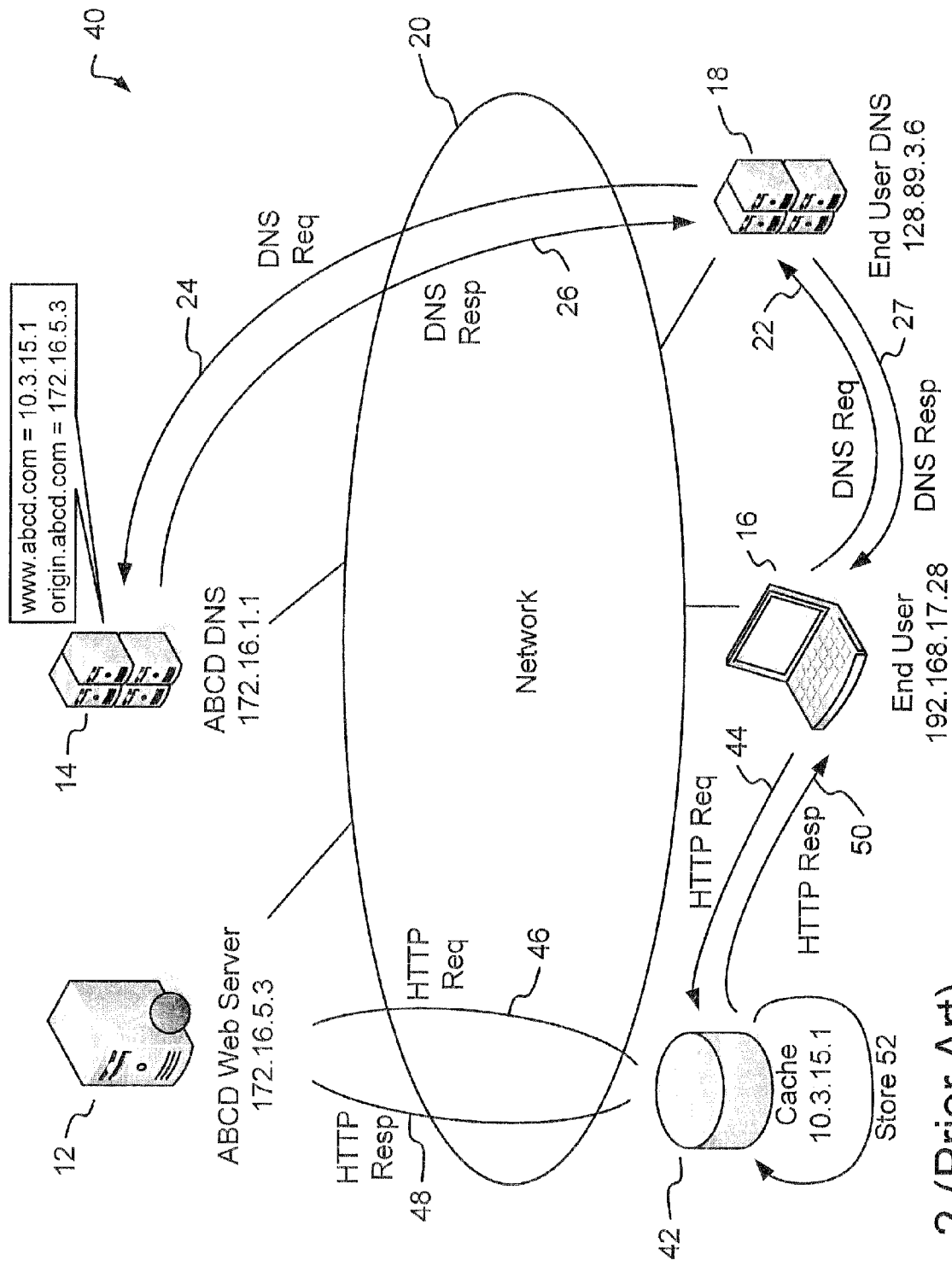
FIG. 2 is a depiction of a prior Web transaction using reverse-proxy caching.

FIG. 2 illustrates a Web transaction with reverse proxy caching 40. That is, the transaction 40 is the same basic Web transaction as shown in FIG. 1, but now employs a reverse proxy content server (shown as a cache server) 42 acting on behalf of the Web server 12. During reverse-proxy caching, the cache server 42 assumes the identity of the Web server 12 so that a Web request directed to the Web server 12 (in the example, "www.abcd.com") is instead directed to the cache server 42. This re-direction is accomplished by changing the entry for the Web site ("www.abcd.com") in the authoritative DNS system 14 so that the host name resolves to the address of the cache server 42 instead of the address of the original Web server 12. A new name is assigned to the address of the original Web server 12 (e.g., "origin.abcd.com"). Thus, 22, 24, 26 and 27 are the same as in FIG. 1. However, the IP address returned by the authoritative DNS system 14 is that of the cache server 42, not the Web server itself, as was previously described with reference to FIG. 1. Consequently, instead of sending the subsequent content request to and receiving a response from the Web server 12 (as was shown in steps 28 and 30 of FIG. 1), the end-user system 16 sends the content request to the cache server 22 ("HTTP Req 44") and the cache server 22 fetches the requested content from the Web server ("HTTP Req 46"). The Web server 12 returns the requested content to the cache server 42 ("HTTP Resp 48"). The cache server 42 completes the transaction by serving the requested content to the end-user system 16 ("HTTP Resp 50") and caching the content so the content will be readily available to support future requests for the same content ("store"52).

Figure 3:
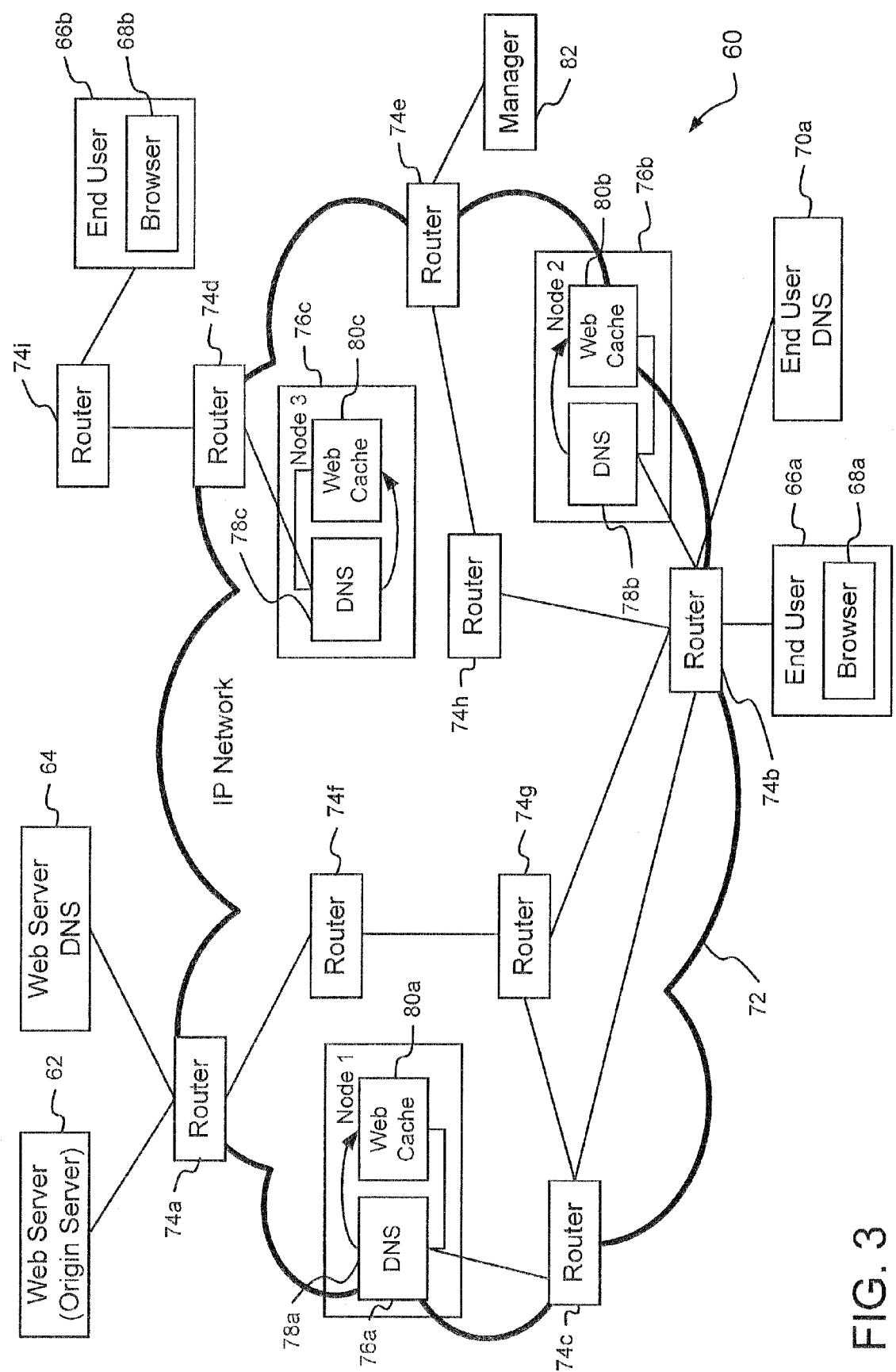
FIG. 3 is a block diagram of an exemplary content distribution network which includes content distribution nodes that support reverse-proxy caching and anycast address service to achieve distributed content delivery and load balancing.

FIG. 3 shows a content distribution network ("CDN") 60. The CDN 60 includes at least one Web server, shown as a Web server 62, a DNS system 64 for Web server 62, and end-user stations 66a and 66b, all connected to a network 72. The network 72 is implemented as the public Internet. The end-user stations execute Web browsers 68a and 68b, respectively. Each end-user station 66 has an associated end user DNS, however, only an end user DNS 70a for the end-user station 66a is shown. Of course, additional end-user stations may be connected to the network 72. Also connected to the network 72 are multiple content distribution nodes 76a, 76b and 76c, which support distributed content delivery services for one or more Web sites on the network 72. The CDN nodes 76 interact with the origin server 62 containing the original Web content, the various DNS systems 64, 70 and, of course, the end-user systems 66.

Each of the CDN nodes 76 includes a DNS system 78 coupled to and associated with a Web content server system or site 80. In one embodiment, as described herein, each content server system 80 is implemented as a cache server system. The techniques described herein could also apply to other types of content servers, such as mirrored Web content servers, or Web content servers having different content (e.g., customized for geographic area). Each DNS system 78 in each node holds a table that includes an address entry which the DNS system 78 uses to map the domain name of the content provider to the IP address of the cache server in that same node. Although only one such Web site (Web site 62) is shown, it will be appreciated that other Web sites may be connected to the network 72 and use the DNS and content caching services of the nodes 76, as will be described. The nodes 76 are deployed at different locations in the network 72. Preferably, the nodes 76 are geographically distributed across the network 72.

Optionally, the CDN 60 may include a CDN manager 82 that can be used by a network administrator (for example, a CDN node hardware and/or CDN node service provider) to configure the CDN to use the CDN nodes.

The network 72 is intended to represent a simplified view of the Internet. In the simplified depiction of FIG. 3, the network 72 includes a plurality of interconnected routers or routing networks, e.g., routers 74a. 74b, . . . , 74g, for routing packets from one domain to another within network 60. In actuality, the Internet is made up of many private "routing networks" (networks including one or more routers, and possibly other types of networking components as well), e.g., local, regional and centralized Internet Service Providers (ISPs), some of which are connected to Network Access Points (NAPs) or exchanges, or each other at public or private peering points. In the simplified Internet configuration shown in FIG. 3, routers 74a, 74b, 74c 74d and 74e are located at network entry points. The end user station 66a and end user DNS system 70a connect to the network 72 via the router 74a. The end user station 66b is coupled to another router 74i, which connects to the router 74d. The Web Server 62 and associated DNS system 64 are connected to the network 72 via the router 74b. Preferably, to the extent possible, and for reasons which will be discussed below, the end user DNS systems such as system 70a are located near the end user systems with which they are associated.

Also, preferably, the geographically dispersed nodes 76 are located so as to be as close as possible to various network entry points, exchanges or both. The network entry points each may correspond to an ISP Point of Presence (POP). In FIG. 3, for illustrative purposes, the nodes 76a, 76b and 76c are shown as being connected to entry point routers 74c, 74b and 74d, respectively, but need not be directly connected to network access routers in this manner.

The caching servers 80 have unique IP addresses. The DNS systems 78 share a common IP address as well as have unique IP addresses. The end-user DNS systems, e.g., end user DNS system 70a, resolve to the common address. That is, the end-user DNS system 70a knows which DNS system (in this example, the DNS system 64) has an address for a high level domain server, e.g., .com, org, and maintains tables of all domain names and knows which server (authoritative DNS server) to consult for the address of the domain server. Thus, the address lookup table in the DNS system 64 is configured to indicate that a server corresponding to the common address can resolve the domain name of the content provider to an IP address.

One way to implement this content distribution configuration is to use an anycast address as the common address. An anycast address is a unicast address that is used in multiple places. Various Internet Engineering Task Force (IETF) Internet Requests for Comments (RFCs) describe implementations of anycast addresses in IP networks. The IETF is a large open international community of network designers, operators, vendors, and researchers concerned with the evolution of the Internet architecture and the smooth operation of the Internet. The following anycast-related RFCs are hereby incorporated by reference in their entirety for all purposes: RFC 1546 (November 1993); RFC 2372 (July 1998); RFC 2373 (August 1998); and RFC 2526 (March 1999).

As described in RFC 1546, an anycast address may include a subnet prefix identifier and an anycast identifier. The subnet prefix may be used to specify the network providing the anycast addresses. The anycast identifier is used to specify one of many possible anycast addresses on a particular subnet. A unicast address, or conventional IP address, specifies a single interface on a computer network. In contrast, an anycast address may specify more than one interface. For example, anycast addresses may be used to specify a group of one or more servers on a computer network. These servers may provide a redundant service. Routers forward packets destined to anycast addresses to the closest anycast destination for a particular address. Thus, anycast addresses provide a way to distribute load across one or more servers The anycast address is advertised to the network 72 from each node 76 using a dynamic routing protocol, the Border Gateway Protocol (BGP). The BGP is a routing protocol used to exchange network reachability information between Internet border routers. It enables those routers to make intelligent routing decisions as to the best path. The BGP is used by such routers as their exterior routing protocol in order to advertise routes to other border routers. BGP uses TCP as its transport protocol for exchanging routing information. Adjacent routers running BGP set up a TCP connection to exchange entire routing tables. Each router has enough information to determine an optimal next hop to a destination. The BGP is also described in various RFCs, including RFC 1267 (October 1991) and RFC 1654 (July 1994), incorporated herein by reference.

Figure 4:
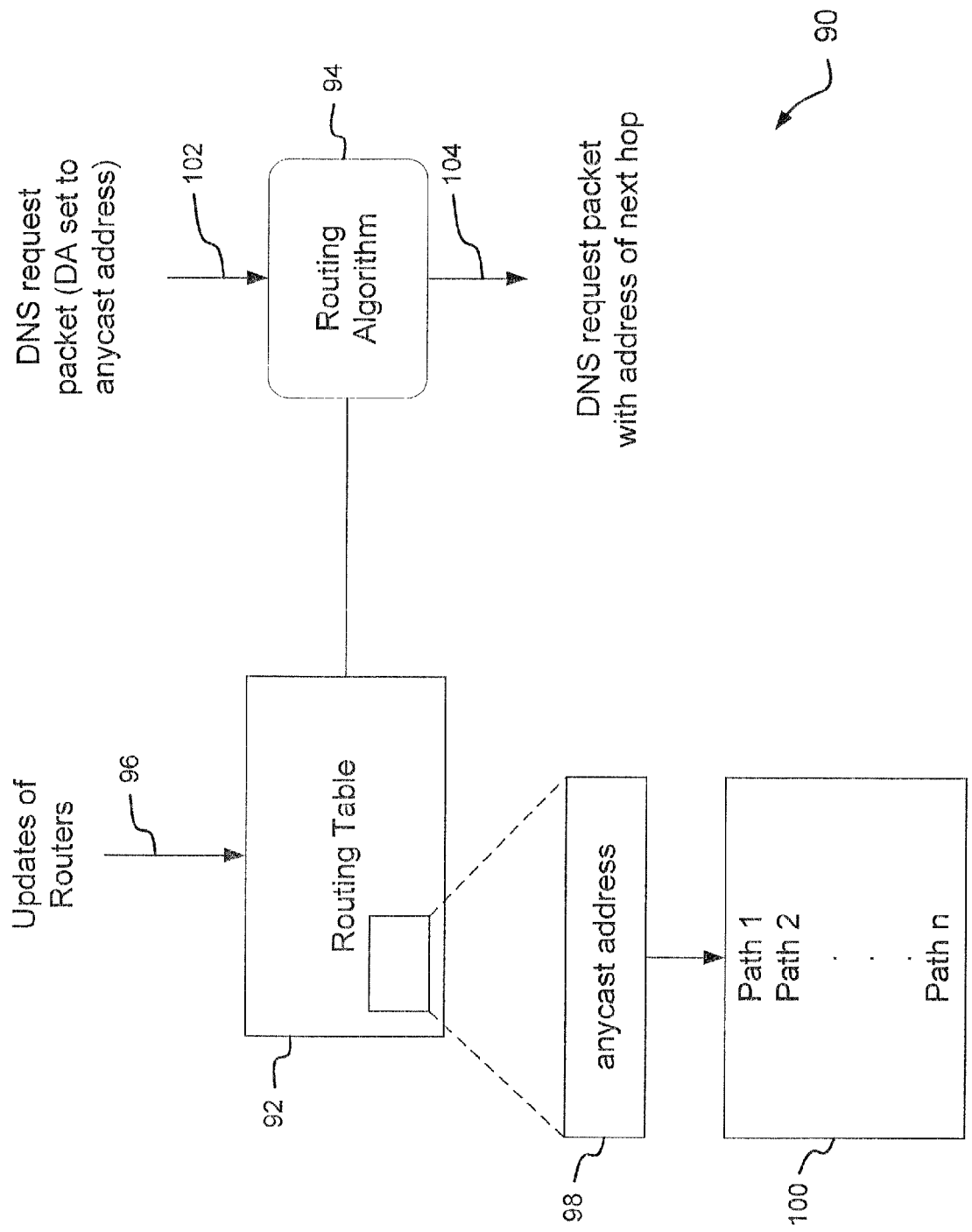
FIG. 4 is a simplified block diagram of routing configuration software and associated table(s) (provided in the routing infrastructure of the content distribution network of FIG. 3) used to perform distributed content site selection based on anycast address routing and Border Gateway Protocol (BGP).

Referring to FIG. 4, routing configuration support 90 in a router such as router 74b includes a routing algorithm (software) 94 and a routing table 92. The router 74b receives address path information from the nodes 76 in accordance with the BGP route information exchanges and updates 96, including the anycast address 98 and associated paths 100 for each of the nodes, and stores them in the routing table 92. As a result of the BGP table information exchanges and updates, routers in the network 72 maintain pointers (that is, the paths or routes) that allow it to determine the next hop to every unique address in the network, as well as multiple pointers to the anycast address. The routing algorithm 94, in response to receipt of a DNS request packet 102 from an end-user system 66 for resolution of a DNS name for the content provider, uses the path information 100 stored in the routing table 92 to a select a path to the nearest CDN node. Thus, a router may see multiple connections to the anycast address, but selects the path that represents the shortest network distance (e.g, the topologically shortest path). More specifically, as this routing occurs as part of a DNS resolution, the router selects a route to the closest DNS system 78. Because the selected DNS system resolves to the address of the cache server in the DNS system's node, the DNS anycast routing, in essence, serves to select the local content site (cache) from which content will be served.

Figure 5:
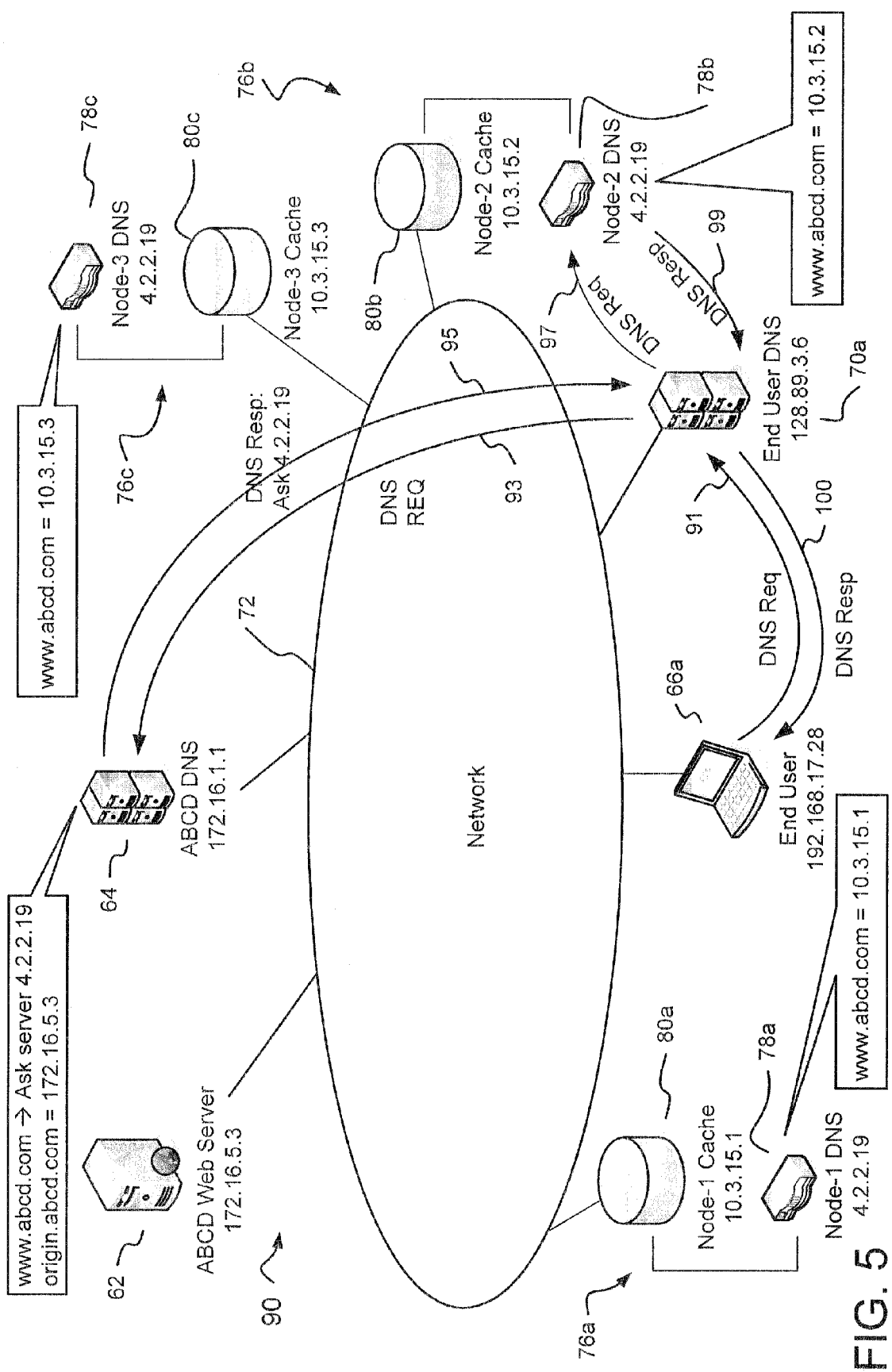
FIG. 5 is a depiction of an exemplary Web transaction using the content distribution network shown in FIG. 3.

Referring now to FIG. 5, a Web transaction 90 occurring over a CDN (such as the CDN 60 shown in FIG. 3) is illustrated for the running example of the "ABCD" Web site. To provide content distribution service for this site, the following configurations are implemented. The original Web server 62 is renamed in the DNS system 64 to reflect a change in its role from being the primary Web server to becoming the original content source for the cache servers 80. The domain "www.abcd.com" is renamed "origin.abcd.com". In the end-user DNS system 70a, an entry is made to indicate that the CDN DNS system 78 is the authoritative server for the end user web domain. For example, in the dns.abcd.com system, the entry for "www.abcd.com" no longer resolves to a specific address but instead refers the content requester to the CDN DNS server 78 at the anycast address of 4.2.2.19. The CDN DNS server entry resolves to the address of the associated node's caching server 80. As a result, each node 76 resolves the Web site name to a different address. In the above example, DNS server 78a in node 76a (node 1) resolves the name "www.abcd.com" to 10.3.15.1, whereas in node 76b (node 2), the DNS server 78b resolves the same address to 10.3.15.2. In this manner, therefore, the entry made in the CDN DNS server 78 in each node enables distribution of the Web site among the cache servers 80 in their respective nodes and locations, as will be described in further detail below.

Once the appropriate configurations have been completed, it is assumed that the Web site www.abcd.com is being handled by the CDN nodes 76. Each node 76 advertises the anycast address of its own DNS server 78 to the network 72 using the BPG protocol, as discussed above. The address of the DNS server at each node is identical. That is, from a network point of view, the network "thinks" it is connected to a single host at multiple points.

Referring to FIGS. 3 and 5, the Web transaction operation 90 is as follows. When an end user of the end-user station 66a requests an object from the now "accelerated" Web site, the end-user system 66a first resolves the content provider name via DNS. That is, the end-user station (acting as a content requestor) sends a request to the local DNS server 70a ("DNS Req 92"). That server 70a resolves the name, ultimately by sending a request to the CDN DNS anycast address. The DNS server 70a sends a request to the ABCD DNS server 64 ("DNS Req 94"), which returns the anycast address of the CDN nodes 76 to the requesting DNS server 70a (DNS Resp 96). The DNS server 70a then transmits a DNS name resolution request addressed to the anycast address and that request is generally routed (by various ones of the network routers 74a-74h) to the CDN node nearest the user's DNS system ("DNS Req 96"). In this instance, because the request enters the network via the router 74b, the router 74b determines that the shortest path to the anycast address is the path to the node 76b (node 2). At that node, the DNS server 78b resolves the name to the cache server address for that node, that is, IP address 10.3.15.2 assigned to the cache server 80b, and returns the cache server address to the end-user DNS server 70a ("DNS Resp 98"). The end-user DNS server 70a forwards the address to the end-user system 66a ("DNS Resp 100). From this point on, the remaining steps of the transaction are much the same as steps 44 through 52, shown in FIG. 2. That is, the end-user system 70a requests the Web object from the cache server in the nearby node where the DNS name was resolved, i.e., node 76b, and that node's cache server 80b, in turn, checks for a cached version of the object (if cached content already resides on the cache server). If no content has yet been cached in the server, or the cached copy is stale or otherwise invalid, the cache server 80b retrieves the Web object from the origin server 62, and serves the object to the end-user system that requested it.

Typically, as is known in the art, Web content can be marked with certain caching attributes, for example, whether or not the content is at all cacheable, how long the content may be held in cache. In the case of the former attribute, if the content is marked as uncacheable (e.g., dynamic or content containing sensitive information), the cache server discards the content after serving it to the requester. Otherwise, if the content is cacheable, the cache server will store the content in local storage and maintain the cached content according to any other cache attributes. Content can be localized, for example, using ad insertions with local content. Content in the caches can be pre-loaded (all the cache servers receiving the same content). That is, the content can be replicated on all cache servers so that even the first request will have a fast response time. Preferably, the caches are not preloaded with content but instead build their cached content based on user requests/usage over time. Content is retrieved from the origin server 12 when a first user request is received, and then stored locally. If subsequent requests are received for the same content, the cached copy is used if it is still valid, as was mentioned earlier. Thus, the cache server need not retrieve the content from the origin server again. Each cache server contains a translation table so that it knows where to retrieve any particular Web page from the origin server. For example, the cache server 80b would know that the page "www.abcd.com/PriceList" can be retrieved from "origin.abcd.com/PriceList".

Preferably, the CDN node contains software to monitor the load in various parts of the node cache system (disk, CPU, I/O, et cetera) by determining at least one load metric value (based on metrics such as utilization, latency, etc.) and comparing each such metric value to a predefined overload threshold. Upon reaching a predefined overload threshold, the monitoring software informs the routing software in the CDN DNS server to withdraw its BGP routing advertisement.

Thus, under normal conditions, all CDN nodes are advertising the address of their DNS servers to the network, and so a DNS request will be directed to the nearest CDN node. If a node becomes heavily loaded and detects an overload condition through its internal monitoring, the node stops advertising its DNS address to the network so that no further requests will be directed to that node. Consequently, DNS requests that normally would have been routed to that node as a first choice are routed to the next closest active node.

This overload detection and load balancing mechanism has the advantage that Web transactions already in progress are not interrupted by a shift in resources. Any system that has already resolved a DNS name to the now inactive node will continue using that node until the DNS name expires. The load in that node will slowly decrease until such time as the node can start accepting new clients, at which time it will start advertising its DNS system address to the network again.

Other embodiments are contemplated. For example, it is possible to use an anycast scheme with the cache servers themselves. With reference to the system shown in FIG. 3, the network routing directs the DNS request from the end user's DNS system, such as system 70a, to the closest of the CDN nodes 76. Although the node is the node closest to the end user's DNS system, it may not necessarily be the closest to the end-user system. In those cases where the end user's DNS system is a substantial distance from the end user, it is possible that the end user system will use a CDN node that is not the closest one to the end user system. Allowing the cache servers to use a common address would ensure that the end user's Web request is indeed routed to the nearest CDN node. There is a significant drawback associated with using the anycast-addressable cache server approach, however. The client/server portion of the transaction uses the TCP protocol, thus requiring multiple exchanges between the end user and the cache server to complete a transaction. With anycasting, there is no guarantee that subsequent packets in a transaction will be routed to the same server. In cases where the packets are split between two or more cache servers, a successful transaction cannot occur. In contrast, although requiring that the end user DNS system be located in close proximity to the end user system for optimal CDN performance, the anycast-based DNS resolution is completed using a single packet exchange with the stateless UDP protocol, thus eliminating the packet-by-packet load distribution problem seen with TCP.

In addition, the Web caches, i.e., the cache systems 80 each can be implemented to include multiple caches servers connected, for example, in a cluster configuration. There may be multiple servers available to support one customer (origin server) or, alternatively, one or more cache servers available to support multiple customers' content cached at one node (site). In yet another alternative, the cache server clusters can include a switch to select from among the cache servers in a given node/cluster based on a predetermined selection policy, for example, content-aware selection (which enables the clustered servers store different content, and maps requested objects to the appropriate servers), load balancing, and so forth, using known techniques.

Other embodiments are within the scope of the following claims.

What is claimed is:
1. A method of content delivery in a network, the method comprising:
(A) providing a plurality of Domain Name System (DNS) servers associated with a Content Delivery Network (CDN), said plurality of CDN DNS servers sharing a common anycast address, wherein each CDN DNS server is associated with a respective plurality of content servers;
(B) causing said plurality of CDN DNS servers to be authoritative for a hostname associated with a content provider by causing said common anycast address to be associated with said hostname;
(C) responsive to a request for content associated with the content provider and issued by a client, said request including at least said hostname,
  (c1) causing said hostname to be resolved to said common anycast address by an Internet Service Provider (ISP) DNS server; and then
  (c2) by one of said plurality of CDN DNS servers, resolving said hostname to identify an IP address for use by the client to retrieve the content from a content server.

2. The method as recited in claim 1 wherein at least some of said plurality of CDN DNS servers are located at network Points of Presence (POPs).

3. The method as recited in claim 2 wherein each of said plurality of CDN DNS servers is located at a network POP.

4. The method as recited in claim 2 wherein at least one of said plurality of CDN DNS servers and respective plurality of content servers is grouped as a cluster.

5. The method as recited in claim 1 wherein each of said plurality of content servers is associated with a network Point of Presence (POP).

6. The method as recited in claim 1 further comprising:
(D) by the content server, attempting to serve the content.

7. The method as recited in claim 6 wherein said step (D) of attempting comprises:
  (d1) if a valid version of the content is available on the content server, serving the content; otherwise
  (d2) obtaining the content from a content source and then serving the content.

8. The method as recited in claim 7 wherein, said content source is an origin server associated with said content provider.

9. The method as recited in claim 7 wherein, if a valid version of the content is not available on the content server, the content server uses a table to ascertain where to obtain the content.

10. The method as recited in claim 1, wherein selection of the content server is based on a load balancing policy.

11. The method of claim 1 further comprising:
  (c3) by at least one switch, selecting the content server from said respective plurality of content servers associated with said resolving CDN DNS.

12. The method of claim 11, wherein the step of (c3) is performed in accordance with a predetermined selection policy.

13. A method of content delivery for delivering content on behalf of a plurality of content providers, the method comprising:
  (A) providing a plurality of Domain Name System (DNS) servers, said plurality of DNS servers sharing a common anycast address, wherein each DNS server is associated with a respective plurality of content servers;
  (B) configuring each DNS server and respective plurality of content servers to support content delivery for a plurality of content providers, wherein each of the plurality of content providers has a respective hostname associated therewith;
  (C1) responsive to a first request for first content associated with a first content provider of said plurality of content providers, said first request including at least a first hostname associated with the first content provider,
    (c11) by a first DNS server of said plurality of DNS servers, resolving said first hostname to identify a first IP address to be used for retrieval of the first content from a first content server of said content servers associated with said first DNS server;
    (c12) by a switch associated with said resolving DNS server of step (c11), selecting the first content server from said respective plurality of content servers associated with the DNS server of step (c11); and
    (c13) attempting to serve said first content from the first content server; and
  (C2) responsive to a second request for said first content associated with said first content provider of said plurality of content providers, said second request including at least the first hostname associated with the first content provider,
    (c21) by a second DNS server of said plurality of DNS servers, resolving said first hostname to identify a second IP address for retrieval of the first content from a content server associated with the second DNS server;
    (c22) by a switch associated with said resolving DNS server of step (c21), selecting the second content server from said respective plurality of content servers associated with the DNS server of step (c21); and
    (c23) attempting to serve said second content from the second content server.

14. The method as recited in claim 13, wherein selection of at least one of the first content server and the second content server is based on a load balancing policy.

15. The method as recited in claim 13, wherein the resolving DNS server of step (c11) is the same as the resolving DNS server performing of step (c21).

16. The method as recited in claim 15, wherein the switch of step (c12) is the same as the switch of step (c22).

17. The method as recited in claim 15, wherein the first content server is the same as the second content server.

18. A content delivery system for delivering content on behalf of a plurality of content providers, each of said plurality of content providers having a hostname associated therewith, the system comprising:
  (A) a plurality of Domain Name System (DNS) servers, said plurality of DNS servers sharing a common anycast address, said plurality of DNS servers being authoritative for said hostnames associated with said plurality of content providers;
  (B) a set of content servers associated with each DNS server, each set comprising at least a plurality of content servers; and
  (C) at least one switch associated with each set of content servers, wherein
  (D) responsive to a request to resolve a hostname associated with a particular content provider of said plurality of content providers, said request being associated with an end-user request for content of said particular content provider, one of said plurality of DNS servers is operable to resolve said hostname to identify an IP address for use by the end-user to retrieve the content from a content server,
  (E) the at least one switch associated with the set of content servers of the resolving DNS server is operable to perform load balancing to select the content server from the set of content servers associated with the resolving DNS server, and (F) the content server is operable to serve the content to the end-user.

19. A method of content delivery, the method comprising:
(A) providing a plurality of CDN Domain Name System (DNS) servers, said plurality of DNS servers sharing a common anycast address, each DNS server being associated with a respective plurality of content servers, wherein at least some of said plurality of content servers are located at network Points of Presence (POPs);
(B) causing said plurality of DNS servers to be authoritative for a hostname associated with a content provider by causing said common anycast address to be associated with said hostname;
(C) responsive to a request for content associated with the content provider by a client, said request including at least said,
   (c1) by one of said plurality of DNS servers, resolving said hostname to identify an IP address for use by the client to retrieve the content from a content server; and
   (c2) by at least one switch, selecting the content server from said respective plurality of content servers associated with said resolving DNS server,
(D) by the content server,
   (d1) attempting to serve the content by:
      (d11) if a valid version of the content is available on the content server, serving the content; otherwise
      (d12) obtaining the content from a content source and then serving the content.

20. The method as recited in claim 19, wherein selection of the content server is based on a load balancing policy.

21. A method of content delivery in a network, the method comprising:
(A) providing a plurality of Domain Name System (DNS) servers associated with a Content Delivery Network (CDN), the plurality of DNS servers sharing a common anycast address, wherein each DNS server is associated with a set of content servers, each set comprising at least a plurality of content servers;
(B) causing the plurality of DNS servers to be authoritative for a hostname associated with a content provider by causing the common anycast address to be associated with the hostname;
(C) responsive to a request for content associated with the content provider and issued by a client, the request including at least the hostname,
   (c1) by one of the plurality of DNS servers, resolving the hostname to identify an IP address for use by the client to retrieve the content from a content server; and
   (c2) by at least one switch associated with the set of content servers of the resolving DNS server, selecting the content server from the set of content servers associated with the resolving DNS server.

22. A content delivery system comprising a plurality of nodes, wherein each node comprises:
a Domain Name System (DNS) server sharing an anycast address with DNS servers in other nodes of the content delivery system, wherein the DNS server is authoritative for hostnames associated with a plurality of content providers;
a plurality of content servers; and
at least one switch, wherein
responsive to a request by a client for content associated with a particular content provider of the plurality of content providers, the request including at least a hostname associated with the particular content provider, the DNS server is operable to resolve the hostname to identify an IP address for use by the client to retrieve the content from a content server,
the at least one switch is operable to select the content server from the plurality of content servers, and
the content server is operable to serve the content to the client.

23. A method comprising:
(A) providing a plurality of Domain Name System (DNS) servers, said plurality of DNS servers sharing a common anycast address, wherein each DNS server is associated with a respective plurality of content servers, wherein each DNS server and respective plurality of content servers is configured to support content delivery for a plurality of content providers;
(B) responsive to a first request for first content associated with a first content provider of said plurality of content providers, said first request including at least a first hostname associated with the first content provider, by a first DNS server of said plurality of DNS servers, resolving said first hostname to identify a first IP address of a content server of the plurality of content servers associated with said first DNS server; and
(C) responsive to a second request for second content associated with a second content provider of said plurality of content providers, said second request including at least said first hostname associated with the first content provider, by a second DNS server of said plurality of DNS servers, resolving said first hostname to identify a second IP address associated with a content server of the plurality of content servers associated with the second DNS server.

* * * * *